(12) United States Patent
Yin et al.

(10) Patent No.: US 11,804,067 B1
(45) Date of Patent: Oct. 31, 2023

(54) FINGERPRINT SENSING DEVICE AND WEARABLE ELECTRONIC DEVICE

(71) Applicant: Guangzhou Tyrafos Semiconductor Technologies Co., LTD, Guangzhou (CN)

(72) Inventors: Ping-Hung Yin, Taipei (TW); Chih-Hung Li, Kaohsiung (TW); Haici Kong, Guangdong (CN); Sueishuang Liou, GuangDong (CN)

(73) Assignee: Guangzhou Tyrafos Semiconductor Technologies Co., LTD, Guangzhou (CN)

( * ) Notice: Subject to any disclaimer, the term of this patent is extended or adjusted under 35 U.S.C. 154(b) by 0 days.

(21) Appl. No.: 17/964,054

(22) Filed: Oct. 12, 2022

(30) Foreign Application Priority Data

Apr. 20, 2022 (TW) .................................. 111114989

(51) Int. Cl.
  *G06V 40/12* (2022.01)
  *G06V 10/147* (2022.01)
  *G06V 40/13* (2022.01)
  *G06V 40/10* (2022.01)

(52) U.S. Cl.
  CPC ........ *G06V 40/1388* (2022.01); *G06V 10/147* (2022.01); *G06V 40/1318* (2022.01); *G06V 40/15* (2022.01)

(58) Field of Classification Search
  CPC ............. G06V 40/1388; G06V 10/147; G06V 40/1318; G06V 40/15
  See application file for complete search history.

(56) References Cited

U.S. PATENT DOCUMENTS

| | | | |
|---|---|---|---|
| 11,551,472 B1* | 1/2023 | Liu | G06V 10/82 |
| 2020/0327302 A1* | 10/2020 | He | G06F 3/0421 |
| 2021/0106283 A1* | 4/2021 | Zhong | G06V 40/10 |
| 2021/0150178 A1* | 5/2021 | Wang | G06V 40/1318 |
| 2021/0325735 A1* | 10/2021 | Liao | G02F 1/133617 |
| 2022/0254185 A1* | 8/2022 | Chou | G06V 40/1365 |
| 2022/0378377 A1* | 12/2022 | Au | G16H 50/70 |

\* cited by examiner

*Primary Examiner* — Premal R Patel
(74) *Attorney, Agent, or Firm* — JCIPRNET

(57) ABSTRACT

A fingerprint sensing device and a wearable electronic device are provided. The fingerprint sensing device includes an image sensor and a processor. The image sensor is arranged below a fingerprint sensing area. The processor is coupled to the image sensor. The processor senses a finger placed above the fingerprint sensing area through the image sensor during a fingerprint sensing period to obtain a first fingerprint image. The processor continuously senses the finger placed above the fingerprint sensing area through the image sensor during a physiological information sensing period, so as to obtain a physiological characteristic signal.

8 Claims, 4 Drawing Sheets

FINGERPRINT SENSING DEVICE AND WEARABLE ELECTRONIC DEVICE

CROSS-REFERENCE TO RELATED APPLICATION

This application claims the priority benefit of Taiwan application serial no. 111114989, filed on Apr. 20, 2022. The entirety of the above-mentioned patent application is hereby incorporated by reference herein and made a part of this specification.

BACKGROUND

Field of the Disclosure

The present disclosure relates to an image sensing technology, and more particularly, to a fingerprint sensing device and a wearable electronic device.

Description of Related Art

Most of the existing physiological information sensing methods adopt photosensitive elements and peripheral circuit elements to sense changes in the user's subcutaneous vascular images and digitize light intensity, and adopt photoplethysmography (PPG) for analysis. As a result, conventional physiological feature sensing system often has the problems that the overall system is large and inflexible and requires high computing power, which causes limitations to reliability, power consumption and cost of the conventional physiological characteristic sensing system.

SUMMARY OF THE DISCLOSURE

The present disclosure provides a fingerprint sensing device and a wearable electronic device, which may provide effective fingerprint and physiological information sensing functions.

The fingerprint sensing device of the disclosure includes an image sensor and a processor. The image sensor is arranged below a fingerprint sensing area. The processor is coupled to the image sensor. The processor senses a finger placed above the fingerprint sensing area through the image sensor during a fingerprint sensing period to obtain a first fingerprint image. The processor continuously senses the finger placed above the fingerprint sensing area through the image sensor during a physiological information sensing period, so as to obtain a physiological characteristic signal.

The wearable electronic device of the present disclosure includes a transparent panel and a fingerprint sensing device. The transparent panel has a fingerprint sensing area. The fingerprint sensing device includes an image sensor and a processor. The image sensor is arranged below the fingerprint sensing area. The processor is coupled to the image sensor. The processor senses the finger placed above the fingerprint sensing area through the image sensor during the fingerprint sensing period to obtain a first fingerprint image. The processor continuously senses the finger placed above the fingerprint sensing area through the image sensor during the physiological information sensing period, so as to obtain the physiological characteristic signal.

Based on the above, the fingerprint sensing device and the wearable electronic device of the present disclosure may determine whether the sensing object is a real finger according to the sensing result of the physiological information, so as to further perform fingerprint recognition on the fingerprint image. That is to say, the fingerprint sensing device and the wearable electronic device of the present disclosure may realize an effective fingerprint anti-counterfeiting function.

In order to make the above-mentioned features and advantages of the present disclosure more comprehensible, the following examples are given and described in detail with the accompanying drawings as follows.

DESCRIPTION OF EMBODIMENTS

Figure 1:
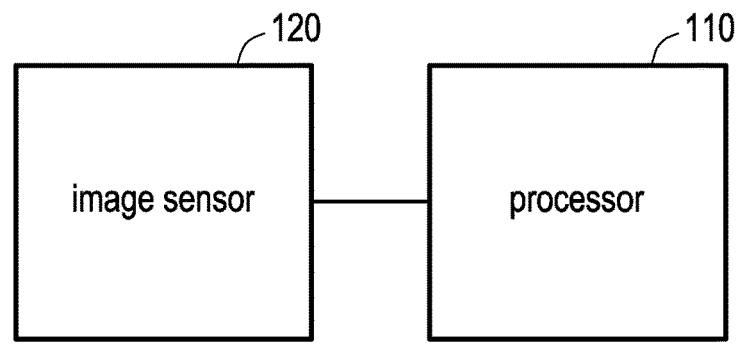
FIG. 1 is a schematic circuit diagram of a fingerprint sensing device according to an embodiment of the present disclosure.

In order to make the content of the present disclosure easier to understand, the following specific embodiments are taken as examples by which the present disclosure may indeed be implemented. Additionally, where possible, elements/components/steps using the same reference numerals in the drawings and embodiments represent the same or similar parts.

FIG. 1 is a schematic circuit diagram of a fingerprint sensing device according to an embodiment of the present disclosure. Referring to FIG. 1, the fingerprint sensing device 100 includes a processor 110 and an image sensor 120. The processor 110 is coupled to the image sensor 120. The fingerprint sensing device 100 may be provided in a wearable electronic device, but the present disclosure is not limited thereto. In an embodiment, the fingerprint sensing device 100 may also be disposed in, for example, a smart phone or a tablet computer. In this embodiment, the image sensor 120 may be a CMOS image sensor (CIS) or a sensor including a charge coupled device (CCD). In this embodiment, the image sensor 120 may further be integrated with circuits such as an amplifier and an analog to digital converter (ADC) to directly output a digital sensing result. In this embodiment, the image sensor 120 may include a 216×216 image array (pixel array), and each pixel unit may output, for example, a 10-bit digital sensing result, but the disclosure is not limited thereto.

In this embodiment, the processor 110 may be a processing circuit or a control circuit having a computing function such as a central processing unit (CPU), a microprocessor (MCU), or a field programmable gate array (FPGA), etc., but the present disclosure is not limited thereto. The processor 110 and the image sensor 120 may be integrated into a fingerprint sensing module, or the processor 110 may belong to a processing unit of an electronic device in which the fingerprint sensing device 100 is integrated. In addition, the fingerprint sensing device 100 may further include a memory for storing the fingerprint images and fingerprint analysis modules, programs or algorithms mentioned in various embodiments of the present disclosure to be accessed and executed by the processor 110.

Figure 2:
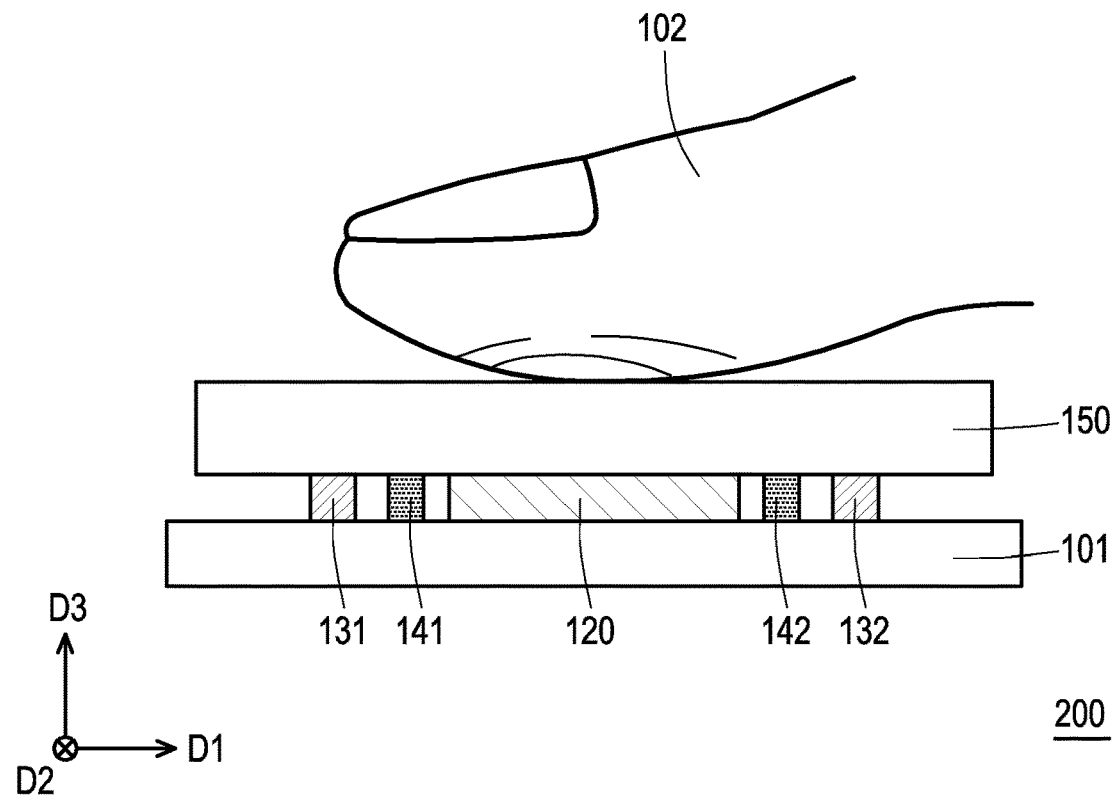
FIG. 2 is a schematic structural diagram of a wearable electronic device according to an embodiment of the present disclosure.

FIG. 2 is a schematic structural diagram of a wearable electronic device according to an embodiment of the present disclosure. Referring to FIG. 1 and FIG. 2, in this embodiment, the wearable electronic device 200 includes a transparent panel 150 and the fingerprint sensing device 100 shown in FIG. 1. The image sensor 120 of the fingerprint sensing device 100 may be disposed on the surface of the substrate 101, and may be disposed below the sensing area of the transparent panel 150 (e.g., a glass panel). The surface of the substrate 101 and the sensing area of the transparent panel 150 may be parallel to a plane formed by extending in the direction D1 and the direction D2, respectively. The direction D1, the direction D2, and the direction D3 are perpendicular to each other. The fingerprint sensing device 100 may further include a micro lens array (not shown), and the micro lens array may be disposed on the image sensor 120. The image sensor 120 faces the direction D3 to sense the finger 102 through the micro lens array and the sensing area of the transparent panel 150 to obtain a fingerprint image. In addition, it should be noted that the structure shown in FIG. 2 is an exemplary diagram of a partial structure of the wearable electronic device 200, and the overall appearance of the wearable electronic device 200 may be determined according to the actual form of product, and the present disclosure is not limited thereto.

In this embodiment, the fingerprint sensing device 100 may further include light sources 131 and 132 and light blocking elements 141 and 142, and the light sources 131 and 132 and the light blocking elements 141 and 142 are disposed on the surface of the substrate 101. The light blocking elements 141 and 142 are disposed between the image sensor 120 and the light sources 131 and 132. The light sources 131 and 132 are coupled to the processor 110. The light sources 131 and 132 may be independent light-emitting elements, and provide visible light during fingerprint sensing period and physiological information sensing period to illuminate the surface of to-be-sensed portion of the finger 102 placed above the fingerprint sensing area. Alternatively, in an embodiment, the fingerprint sensing device 100 does not include the light sources 131 and 132, and the transparent panel 150 may be an organic light-emitting diode (OLED) display panel or other types of self-luminous display panels. In this regard, the transparent panel 150 may provide illumination light (screen light) with a wavelength of 400 nanometers (nm) to 500 nanometers (nm) during the fingerprint sensing period and the physiological information sensing period to illuminate the surface of to-be-sensed portion of the finger 102.

Figure 3:
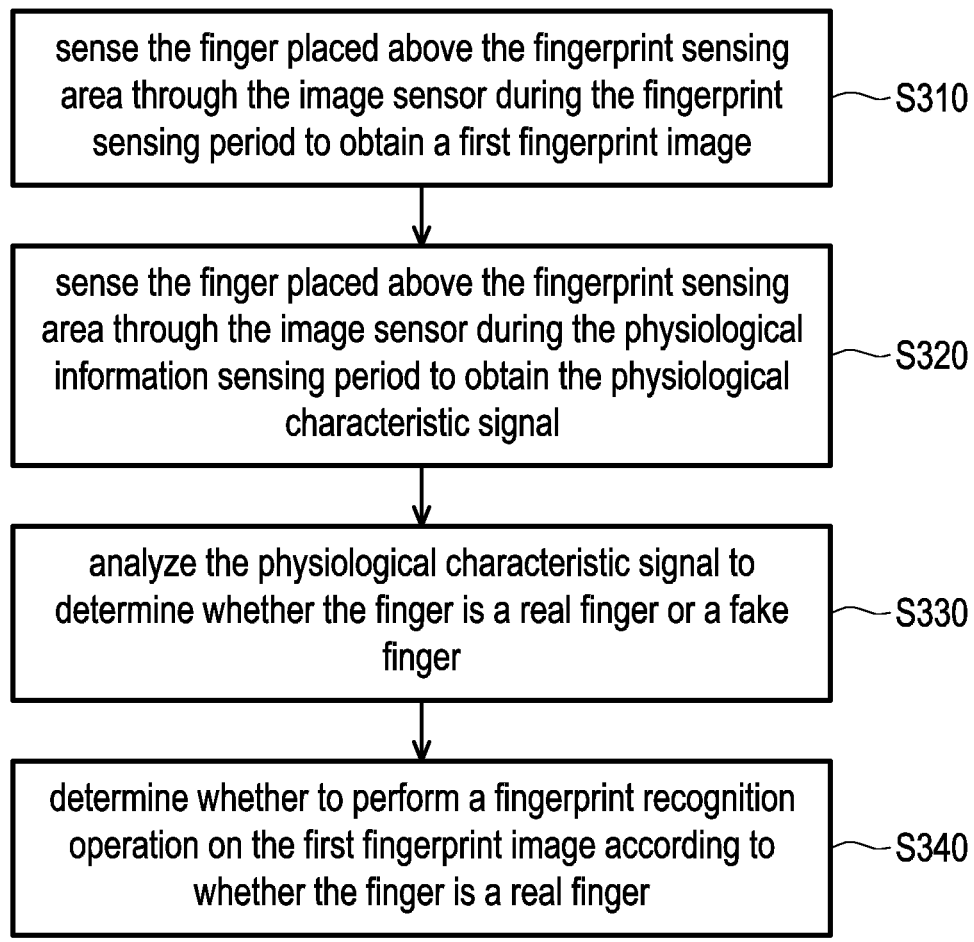
FIG. 3 is a flowchart of a fingerprint sensing method according to an embodiment of the present disclosure.

FIG. 3 is a flowchart of a fingerprint sensing method according to an embodiment of the present disclosure. Referring to FIG. 1 to FIG. 3, the fingerprint sensing device 100 may perform the following steps S310 to S340. In step S310, the processor 110 may sense the finger placed above the fingerprint sensing area through the image sensor 120 during the fingerprint sensing period to obtain a first fingerprint image. In step S320, the processor 110 may continuously sense the finger placed above the fingerprint sensing area through the image sensor 120 during the physiological information sensing period to obtain the physiological characteristic signal. It should be noted that, in this embodiment, the fingerprint sensing device 100 may perform fingerprint sensing first to obtain the first fingerprint image. Next, the fingerprint sensing device 100 may perform physiological information sensing to obtain a physiological characteristic signal, but the present disclosure is not limited thereto. In an embodiment, the fingerprint sensing device 100 may also perform physiological information sensing first to obtain the physiological characteristic signal. Next, the fingerprint sensing device 100 may perform fingerprint sensing to obtain a first fingerprint image. In this embodiment, the processor 110 performs the fingerprint sensing period first, and then performs the physiological information sensing period. However, the present disclosure does not limit the sequence of performing the fingerprint sensing period and the physiological information sensing period. In an embodiment, the processor 110 may also perform the physiological information sensing period first, and then perform the fingerprint sensing period. In other words, the execution order of the aforementioned steps S310 and S320 may be switched.

In step S330, the processor 110 may analyze the physiological characteristic signal to determine whether the finger is a real finger or a fake finger. In step S340, the processor 110 may determine whether to perform a fingerprint recognition operation on the first fingerprint image according to whether the finger is a real finger. If the processor 110 determines that the finger is a real finger, the processor 110 then performs a fingerprint recognition operation on the first fingerprint image. In this way, the fingerprint sensing device 100 obtains the fingerprint image and the physiological information, and may also determine whether the sensing object is a real finger by analyzing whether the physiological information is reasonable, thereby realizing the fingerprint anti-counterfeiting function. It should be noted that, in another embodiment, the fingerprint sensing device 100 may also perform physiological information sensing first, and the processor 110 first analyzes the physiological characteristic signal to determine whether the finger is a real finger or a fake finger. If the processor 110 determines that the finger is a real finger, the processor 110 operates the image sensor 120 to obtain the first fingerprint image and performs fingerprint recognition. Otherwise, if the processor 110 determines that the finger is a fake finger, the image sensor 120 does not perform fingerprint sensing.

Figure 4A:
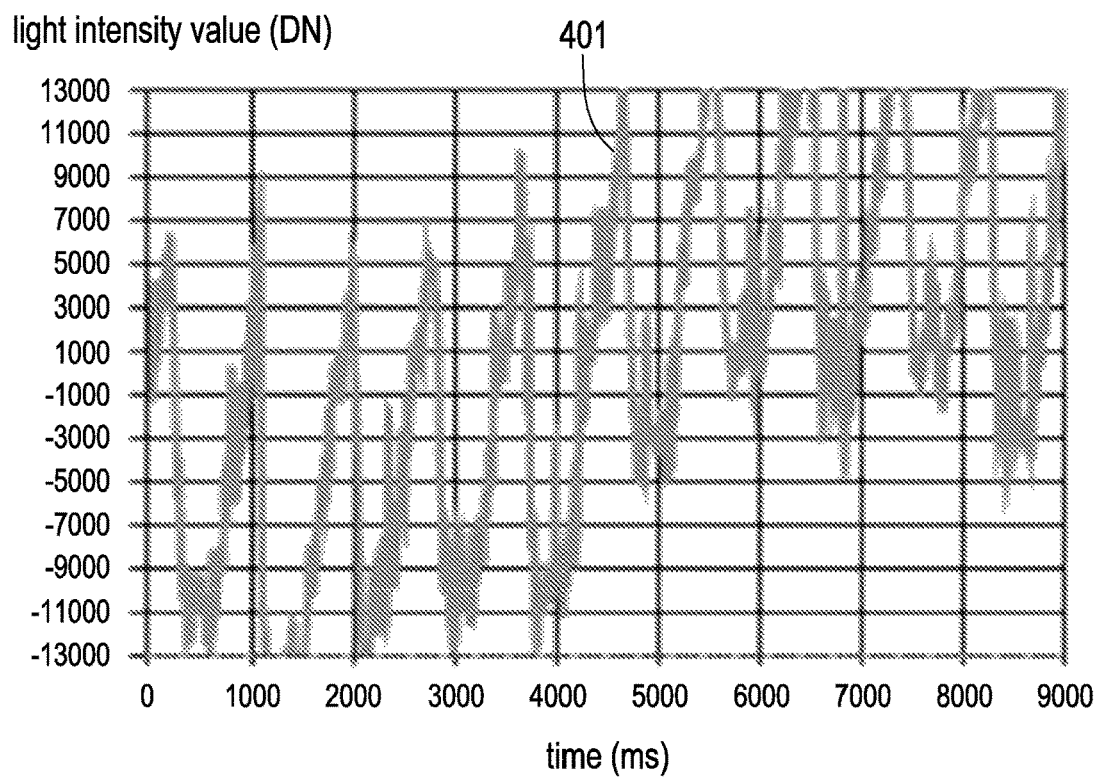
FIG. 4A to FIG. 4C are schematic diagrams of signals according to an embodiment of the present disclosure.
Figure 4B:
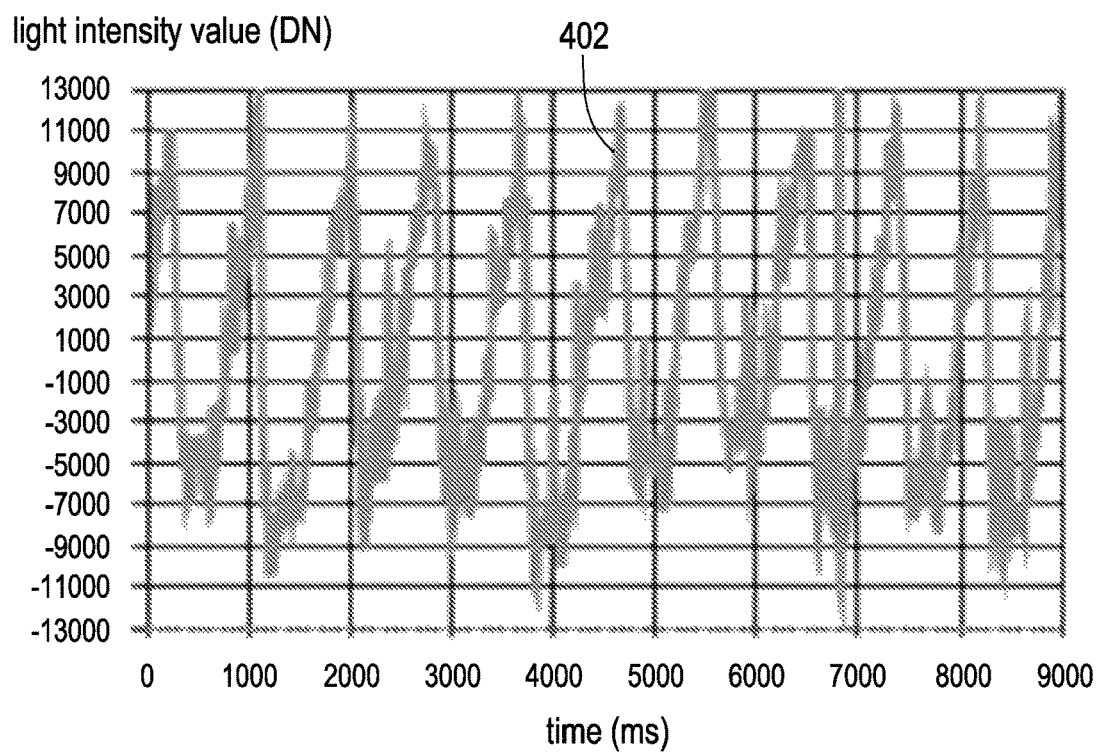
Figure 4C:
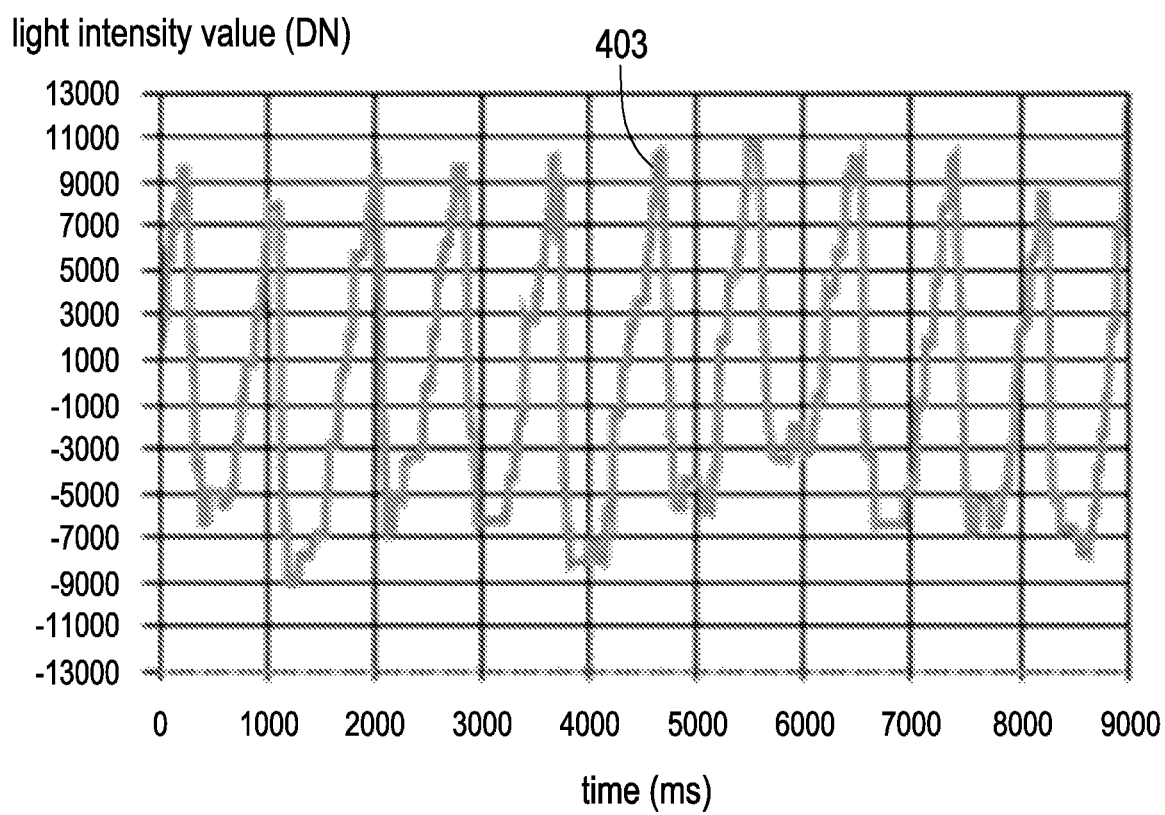

FIG. 4A to FIG. 4C are schematic diagrams of signals according to an embodiment of the present disclosure. Referring to FIG. 1 and FIG. 4A to FIG. 4C, take acquisition of the heart rate value as an example. The processor 110 may continuously perform sensing for a predetermined time length through the image sensor 120 during the physiological information sensing period (that is, the image sensor 120 continuously captures images during the sensing period having the predetermined time length), and superimpose the light intensity values of various pixels of the image array of the image sensor 120 to obtain physiological characteristic signals. For example, the predetermined time period may be 5 seconds (or 5 to 10 seconds), and the image sensor 120 may continuously perform image sensing for multiple times during the predetermined time period. The image sensor 120 may add multiple light intensity values (the unit of which is the digital number (DN) of image metadata) generated by multiple pixels of the image array in each sensing (i.e., one frame corresponds to one light intensity value), and after the constant numerical components are deducted, and sampling is performed according to a specific sampling frequency, a physiological characteristic signal 401 as shown in FIG. 4A may be obtained.

It should be noted that, according to the sampling theorem and practical application conditions, to achieve the condition where the physiological characteristic signal 401 has no signal distortion, the specific sampling frequency may be, for example, at least 10 times or more the highest frequency of the signal to be sampled. In other words, based on the standard that the maximum human heart rate should not be higher than 100 beats per minute, the frame per second (FPS) corresponding to the maximum heart rate may be 1.667, and the sampling frequency should be at least 16.67

FPS. Moreover, in order to avoid errors, the minimum sampling frequency adopted in this embodiment may be 20 FPS.

In this embodiment, the processor 110 can further perform a detrend fluctuation analysis on the physiological characteristic signal 401 to eliminate the influence of signal deviation, and obtain the physiological characteristic signal 402 as shown in FIG. 4B. Next, the processor 110 may further perform a finite impulse response filter (FIR filter) on the physiological characteristic signal 402 to filter out unnecessary noise from the signal, and generate a pulse waveform signal 403 that may be used to calculate the heartbeat as shown in FIG. 4C. In this way, the processor 110 may obtain the corresponding heart rate value (i.e., converted into heart rate per minute) by calculating the number of peaks of the pulse waveform signal 403.

In this embodiment, the processor 110 may determine whether the heart rate value is less than the preset maximum heart rate value and greater than the preset minimum heart rate value, so as to determine whether the finger is a real finger. In an embodiment, the preset maximum heart rate value may be, for example, 100 beats/min, and the preset minimum heart rate value may be, for example, 60 beats/min, but the disclosure is not limited thereto.

To sum up, the fingerprint sensing device and the wearable electronic device of the present disclosure are able to directly output digital sensing results through a highly integrated image sensor, so as to effectively reduce the setup cost of system, component complexity and reduce the size of the module. In addition, the fingerprint sensing device and the wearable electronic device of the present disclosure are able to effectively improve the utilization rate of image data, so as to simultaneously perform fingerprint recognition and physiological information measurement. More importantly, the fingerprint sensing device and the wearable electronic device of the present disclosure are also able to achieve an effective fingerprint anti-counterfeiting function.

Although the present disclosure has been disclosed above with embodiments, it is not intended to limit the present disclosure. Anyone with ordinary knowledge in the technical field can make some changes and modifications without departing from the spirit and scope of the present disclosure. Therefore, the protection scope of the present disclosure shall be determined by the scope of the appended claims.

What is claimed is:

1. A fingerprint sensing device, comprising:
   an image sensor, arranged below a fingerprint sensing area; and
   a processor, coupled to the image sensor,
   wherein the processor senses a finger placed above the fingerprint sensing area through the image sensor during a fingerprint sensing period to obtain a first fingerprint image,
   wherein the processor continuously senses the finger placed above the fingerprint sensing area through the image sensor during a physiological information sensing period, so as to obtain a physiological characteristic signal,
   wherein the image sensor continuously performs sensing for a predetermined time length during the physiological information sensing period, and the processor superimposes a light intensity value of each pixel of an image array of the image sensor and samples according to a sampling frequency to obtain the physiological characteristic signal.

2. The fingerprint sensing device according to claim 1, wherein the processor further analyzes the physiological characteristic signal, and determines whether to perform a fingerprint recognition operation on the first fingerprint image according to whether the finger is the real finger.

3. The fingerprint sensing device according to claim 1, wherein the processor performs the fingerprint sensing period first, and then performs the physiological information sensing period, or the processor performs the physiological information sensing period first, and then performs the fingerprint sensing period.

4. The fingerprint sensing device according to claim 1, further comprising:
   a light source, coupled to the processor and providing a visible light during the fingerprint sensing period and the physiological information sensing period to illuminate the finger placed above the fingerprint sensing area.

5. The fingerprint sensing device according to claim 4, further comprising:
   a light blocking element, arranged between the image sensor and the light source.

6. The fingerprint sensing device according to claim 1, wherein the processor performs a detrend fluctuation analysis and a finite impulse response filter on the physiological characteristic signal to obtain a pulse waveform signal, and the processor calculates the number of peaks of the pulse waveform signal to obtain a heart rate value.

7. The fingerprint sensing device according to claim 6, wherein the processor determines whether the heart rate value is less than a preset maximum heart rate value and greater than a preset minimum heart rate value, so as to determine that the finger is a real finger.

8. A wearable electronic device, comprising:
   a transparent panel, having a fingerprint sensing area; and
   a fingerprint sensing device, comprising:
   an image sensor, arranged below the fingerprint sensing area; and
   a processor, coupled to the image sensor,
   wherein the processor senses a finger placed above the fingerprint sensing area through the image sensor during a fingerprint sensing period to obtain a first fingerprint image,
   wherein the processor continuously senses the finger placed above the fingerprint sensing area through the image sensor during a physiological information sensing period, so as to obtain a physiological characteristic signal,
   wherein the image sensor continuously performs sensing for a predetermined time length during the physiological information sensing period, and the processor superimposes a light intensity value of each pixel of an image array of the image sensor and samples according to a sampling frequency to obtain the physiological characteristic signal.

* * * * *